Jan. 28, 1947. T. HOLLIS, JR 2,414,811
CEMENTED CARBIDE CUTTING TOOL
Filed Sept. 21, 1944
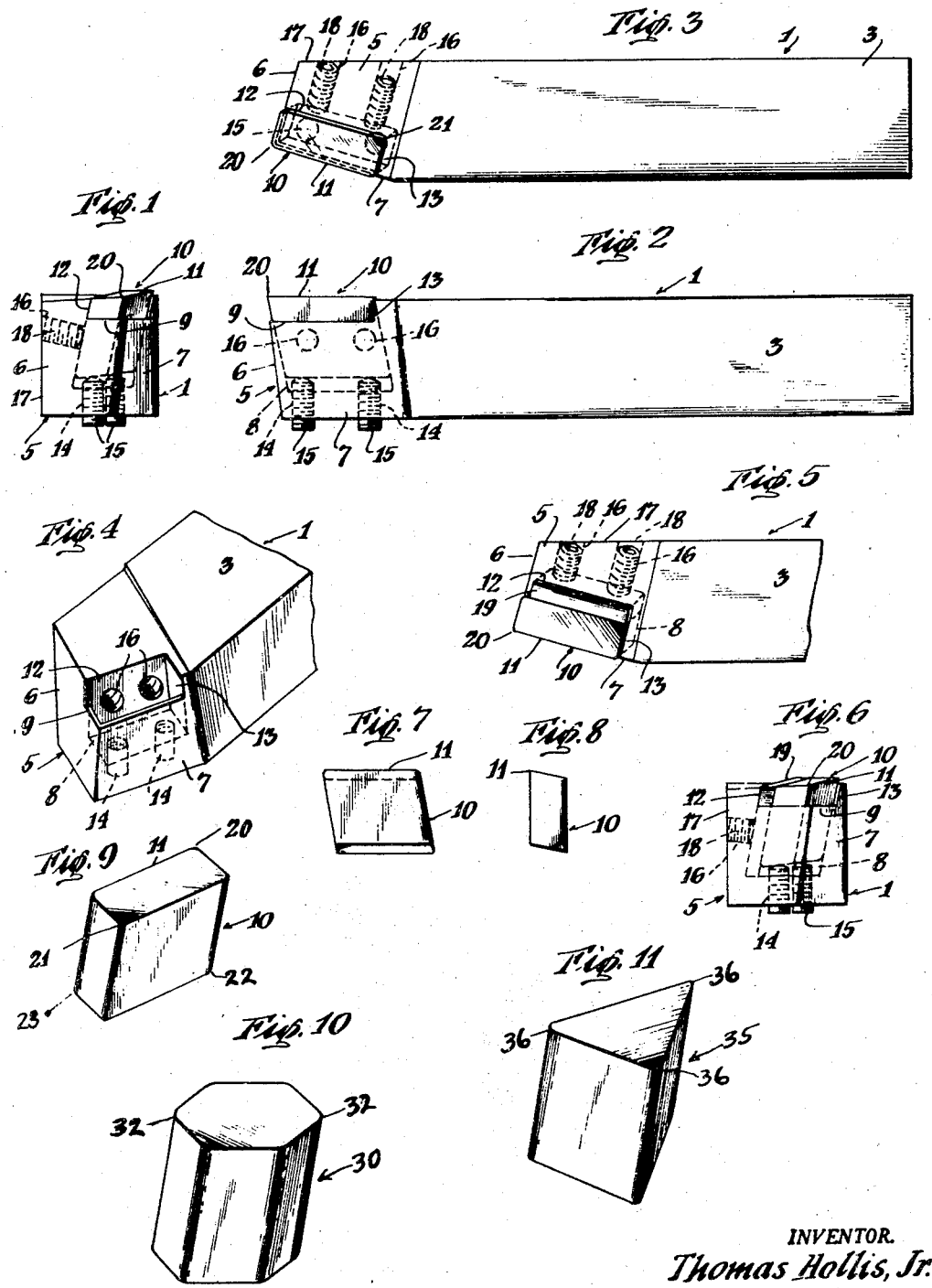
INVENTOR.
Thomas Hollis, Jr.
BY George H*****
ATTORNEY Patented Jan. 28, 1947

2,414,811

UNITED STATES PATENT OFFICE 2,414,811

CEMENTED CARBIDE CUTTING TOOL

Thomas Hollis, Jr., Port Washington, N. Y.

Application September 21, 1944, Serial No. 555,118

10 Claims. (Cl. 29—98)

This invention relates to improvements in cemented carbide tipped cutting tools, and particularly to a cutting tool wherein a cemented carbide cutting tip is held in cutting position in a tool holding shank in a novel manner and may be replaced or adjusted without recourse to brazing and similar time-consuming operations.

Heretofore in applying carbide cutting tips in machine tools and the like it has been the accepted practice to braze the tip onto a steel shank. This operation is not only time-consuming but, what is more important, stresses are set up in the carbide tip due to the differences in the rates of expansion and contraction of the steel shank and the tip with the result that the life of a brazed carbide tip has been relatively short and the types of machining and cutting operations to which such tools might be applied have been limited.

It has been proposed to hold the carbide tip in the holder by mechanical means, but the proposals heretofore made have not proven satisfactory in practice for various reasons, among them being the tendency of the tip to break at the point where localized clamping pressure has been applied or because of localized stresses due to lack of uniform backing support in the holder.

It is an object of the present invention to provide a mechanical holder for the cutting tip wherein the tip is provided with more uniform and positive support and is held in such a position that it is enabled to resist stresses set up in cutting to a much greater extent without failure than would be the case if the tip were disposed in the holder in the conventional manner.

It is a further object of the invention to provide a holder which permits of the use of a specially designed cutting tip having a plurality of cutting radii which may be successively or selectively brought to cutting position in the holder, thereby greatly reducing the time required in changing cutting tools and minimizing shutdowns of the machines for breaking down of the tool set-up and readjusting the tool holder therein.

It is a still further object of the invention to provide a mechanical holder for a carbide cutting tip wherein the cutting tip may be quickly adjusted to bring the cutting edge of the tool to actual work center without shimming or grinding.

It is another object of the invention to provide a novel carbide cutting tip having a plurality of cutting radii and which may be selectively brought to a cutting position when associated in a suitable holder in a tool assembly.

It is still another object of the invention to provide a novel carbide cutting tip which is so shaped as to permit of its adjustment or reversal in the holder to obtain any one of a plurality of rake angles, either neutral, negative, or positive and also to obtain back rakes without necessity or breaking down the tool set-up to effect a change.

Other objects and advantages of the invention will appear as the description proceeds.

Fig. 1 is a front end view of my improved holder with the novel cutting tip associated therewith;

Fig. 2 is a side elevation of the holder of Fig. 1;

Fig. 3 is a top plan view of the holder of Figs. 1 and 2;

Fig. 4 is a perspective view of the head portion of the holder with the shank broken away and with the tip removed;

Fig. 5 is a top plan view of a modification of the holder with the shank portion broken away wherein the reenforcing of the tip in the plane of the cutting edge is provided by a shim introduced between the tip and the back of the recess;

Fig. 6 is an end view of Fig. 5 showing the shim as flush with the top of the tip;

Fig. 7 is a side elevation of one form of the special cutting tip forming a part of the present invention;

Fig. 8 is an end elevation thereof;

Fig. 9 is a perspective view of the tip as seen from the opposite side as compared with Fig. 7;

Fig. 10 is a perspective view of still another form of tip embodying the features of the present invention wherein cutting radii of different angular sizes are embodied in the same tip; and Fig. 11 is a perspective view of a cutting tip of still another cross sectional shape embodying features of the present invention.

As shown in Figs. 1, 2, and 3 of the drawing the holder 1 is shown as having a square shank 3 which may be of a standard size fitting any of various standard machine tools such as an engine, bench or turret lathe and which may be manufactured from a suitable alloy steel such as SAE 9250, 4340, or 4140.

At the opposite end the holder is provided with a head portion 5 terminating in an inclined face portion 6 and an inclined side surface 7, both of which are inclined inwardly and downwardly to increase the clearance of the head with respect to the work when the tool is adjusted to cutting position. As shown the face 6 and the side 7 are inclined inwardly at an angle of 6° to the vertical.

A rectangular recess 8 is provided in the head portion. As shown this recess extends inwardly from the top surface of the head at an angle of 10° to the vertical and in a plane intersecting the longitudinal axis of the holder at an acute angle. The upper marginal edges of the face 6 and the wall 7 are cut away as at 9 so as to permit the tip 10 to present a cutting edge 11 projecting slightly beyond the head portion of the cutting tool and still be backed by the supporting surfaces 12 and 13 of the head.

Holes 14 are drilled and tapped into the bottom of the recess from the opposite face of the holder to receive round point set screws 15 which may be adjusted inwardly and outwardly to bring the tip to the required cutting position and increase the height of the tip to compensate for wear when it is reground from time to time. Similarly holes 16 are provided in the side wall 17 to receive screws 18 which are brought into spaced bearing relation with the side of the tip to hold it firmly within the recess.

It will be observed that the carbide tip, instead of being held flat as is customary, is inserted on end. This arrangement makes it possible to repeatedly grind the tip and readjust it to the desired height. What is more important, the disposition of the tip on end and within a recess which provides support on all sides makes it possible to apply the cutting edge to the work so that the stresses set up in the cutting or other machining operation are largely transmitted endwise of the tip and thus lessens the tendency to break.

A further novel feature of the invention resides in the inclination and disposition of the recess in such relation to the adjacent face 6 and the side wall 7, with the walls of these elements cut away as shown, that the tip can project beyond the face 6 and the side wall 7 sufficiently to provide cutting clearance and at the same time is supported in the plane of the cutting edge by the walls 12 and 13 of the recess. In other words the cutting tip is insured of support along the plane where cutting stresses are applied and it becomes unnecessary to increase the overhang of the cutting tip to the point where undue strains will occur.

In Figs. 5 and 6 there are shown a top plan view and an end view of a modification of the holder with the shank portion broken away wherein a shim 19 is provided within the recess at the back of the tip, and the set screws 18 bear against the shim in clamping the tip in the recess. This insures that the stresses applied by the screws 18 will be distributed over a wide area of the tip. The shim 19 extends to the same height as the wall 12 thus insuring full backing support in the plane of the cutting edge when the tip is properly adjusted.

The tip may take various cross-sectional shapes and dimensions depending upon the nature of the operation to be performed.

As shown in Figs. 1, 2, and 3 and more particularly in Figs. 7, 8, and 9, the tip is rectangular in cross section with the top portion thereof ground or otherwise formed to an inclined angle with respect to the base, and presenting a cutting point 20 when the tip is associated with the holder in the manner shown in Figs. 1, 2, and 3 but which may be reversed to present the cutting point 21 when it is desired to use the tip with a back rake effect. When the tip is reversed end for end the cutting points 22 and 23 may be selectively brought into cutting position by suitably adjusting set screws 15 to bring the cutting edge to the desired working position. When this is done the tool will cut with different rake angles than are provided with the tip in the position shown in Figs. 1–3 or in reversed position previously mentioned. It will be seen that it is possible to use two, four or eight cutting edges all having proper radii by merely rotating the carbide insert and changing it end for end.

As shown more particularly in Fig. 9 as well as in Figs. 10 and 11 the tip may be provided with cutting radii starting from each corner and extending to the opposite end. These may be of the same or different sizes. The provision of a plurality of cutting radii insures to the tipe a greater versatility in that it may be used in as many different positions as there are cutting radii, with a given type of holder, i. e., right hand or left hand, and a corresponding number of positions with a holder having an oppositely disposed recessed head. Another advantage resides in the fact that it is possible to effect the grinding of the radii in the hands of the manufacturer, thus insuring greater uniformity in the product as compared with tips that are sent out unground and are then ground by workers of varied experience.

Figs. 10 and 11 illustrate how the carbide tip may be differently shaped. In Fig. 10 is shown a tip 30 presenting oppositely disposed cutting angles 32 of the type required in certain types of finish turning or profiling and for chamfering. The tip is symmetrical in cross section, thus enabling it to be reversed. The tip 35 of Fig. 11 is shown as an equilateral triangle in cross section, thus presenting three similar cutting angles 36 and permitting it to be adjusted to three different radial positions. It will be understood that these tips will be associated in a recessed head generally similar to that illustrated in Figs. 1–4 inclusive except that the recess will be shaped to conform closely to the sides of the insert. The head will also be provided with adjusting means to raise the height of the tip as it is repeatedly ground and sharpened in use.

The invention is applicable to various kinds of machine tools, among others being single point turning and boring tools and single and multiple point rotating tools designed for stationary cutting and milling operations.

Any of the cemented carbides useful in cutting tools may be employed, such as tungsten carbide, tantalum carbide, titanium carbide, and various complex and mixed carbides such as tungsten-titanium carbide.

It will be appreciated that the novel holder arrangement makes possible notable savings in labor costs and machine shut-downs because of the elimination of breaking down of tool post set-ups or machine set-ups when the tip breaks or needs replacement and that faster, deeper and cooler cuts at increased speeds are possible due to the elimination of brazing strains. Many other advantages may be realized from the use of the invention.

In the application of conventional brazed carbide tools on Lo-Swing and Carbomatic lathes it is invariably necessary to keep the top surface of the tip in the same plane as the top surface of the shank and to maintain a fixed distance between the left side and the point of the tool. It is always necessary to grind or shape the top of the shank after grinding the top of the tip in order to raise the tool to work center. Often it is also necessary to grind or shape the side of the shank in order to maintain fixed distances. With the application of my mechanically held tip all this work is entirely eliminated because the tip can be moved up to compensate for reduction in height.

It is, therefore, obvious that many of the common faults of present carbide tooling are eliminated through the use of my mechanically held carbide insert. Breakage or extreme brittleness of carbide tools is practically eliminated, tests having shown the carbide tool bits in operation to break no more often than do ordinary high speed tool bits used today.

The tool may be manufactured with various shapes of holders and the cutting tip may assume many shapes and angles. Conventional chip breakers, of either ground in or the mechanical type can be readily applied. This makes possible high speed operation without danger of injury to the operator.

Present day carbide tool bits when they have to be sharpened require sharpening on three sometimes four surfaces and resharpening of the radius. This sharpening requires some skill and in most cases considerable time. With the use of my mechanically held bit sharpening of one surface only is necessary and sharpening of radii, which is frequently done improperly, is entirely eliminated. Since there are no strains or stresses in the carbide bit there is no danger of cracking due to excessive heat in grinding. Inexperienced people can sharpen the tool by merely holding it on the table of a grinder and pressing it against the wheel or holding it in a vise on a surface grinder. The only necessary adjustment is to set the table or the vise for the top rake angle that is required.

Since the tip is removable from the shank without removing the shank from the machine, resetting of the tip at the same height as originally established will hold size or diameter of the part machined. In original set-ups where it is not determined what grade of carbide to use, the tool may be set up with one grade and if proven unsatisfactory, an identical tip of a different grade may be substituted without removing the tool from the machine.

It will be understood that various changes in the details of the construction and in the materials employed may be made without departing from the invention which is not to be deemed as limited otherwise than as indicated by the appended claims.

I claim:

1. A carbide cutting tool comprising a tool holder having a shank portion adapted to be secured to the tool post of a machine tool and a head portion having a recess of substantially uniform cross-section throughout its length extending inwardly from one of the lateral faces thereof and being inclined to the vertical sufficiently to insure cutting clearance for a cutting tip inserted therein, and a carbide cutting tip fitting lengthwise within said recess, said recess having side walls cut away adjacent the face of said head to permit said tip to be brought to cutting position in said recess without bringing the cutting edge thereof substantially above the plane of the remaining side walls of the recess, whereby said tip is reenforced laterally adjacent the plane of the cutting edge thereof when it is in cutting position, and means for holding said tip within said recess.

2. A carbide cutting tool comprising a tool holder having a shank portion adapted to be secured to the tool post of a machine tool and a head portion having a recess of substantially uniform polygonal cross section throughout its length extending inwardly from one of the lateral faces thereof and being inclined to the vertical sufficiently to insure cutting clearance for a cutting tip inserted therein, and a carbide cutting tip fitting lengthwise within said recess and presenting a cutting radius extending parallel to its length, and said recess having side walls cut away adjacent the face of said head to permit said tip to be brought to cutting position in said recess without bringing the cutting edge thereof substantially above the plane of the remaining side walls of the recess, whereby said tip is reenforced laterally adjacent the plane of the cutting edge thereof when it is in cutting position, and means for holding said tip within said recess.

3. A carbide cutting tool comprising a tool holder having a shank portion adapted to be secured to the tool post of a machine tool and a head portion having a recess of substantially uniform cross-section throughout its length extending inwardly from one of the lateral faces thereof and being inclined to the vertical sufficiently to insure cutting clearance for a cutting tip inserted therein, and a carbide cutting tip fitting lengthwise within said recess, said recess having side walls cut away adjacent the face of said head to permit said tip to be brought to cutting position in said recess without bringing the cutting edge thereof substantially above the plane of the remaining side walls of the recess, whereby said tip is reenforced laterally in the plane of the cutting edge thereof when it is in cutting position, means for adjusting the position of said tip lengthwise of said recess, and means for releasably holding said tip in a predetermined adjusted position in said recess.

4. A carbide cutting tool comprising a tool holder having a shank adapted to be secured to the tool post of a machine tool and head portion having a recess of substantially uniform polygonal cross-section throughout its length extending inwardly generally at right angles to the longitudinal axis thereof, and a carbide cutting tip fitting lengthwise within said recess and presenting a plurality of cutting radii extending lengthwise of said tip, said tip being adjustable to present said cutting radii selectively in cutting position in said holder, and means for holding said tip within said recess.

5. A carbide cutting tool comprising a tool holder having a shank adapted to be secured to the tool post of a machine tool and a head portion having a recess of equiangular polygonal cross-section throughout its length extending inwardly generally at right angles to the longitudinal axis thereof, and a carbide cutting tip fitting lengthwise within said recess and presenting a plurality of cutting radii extending lengthwise of said tip and corresponding in their angular relation to the angles of said recess, said tip being adjustable to present said cutting radii selectively in cutting position in said holder, and means for holding said tip in a selected position.

6. A carbide cutting tool comprising a tool holder having a shank adapted to be secured to the tool post of a machine tool and a head portion having a recess of substantially uniform polygonal cross-section throughout its length extending inwardly generally at right angles to the longitudinal axis thereof, a carbide cutting tip fitting lengthwise within said recess and presenting a plurality of cutting radii extending lengthwise of said tip, said tip being adjustable to present said cutting radii selectively in cutting position in said holder, means for adjusting said tip lengthwise of said recess, and means for holding said tip in a predetermined adjusted position in said recess.

7. A carbide cutting tool comprising a tool holder having a shank adapted to be secured to the tool post of a machine tool and a head portion having a recess of substantially uniform polygonal cross-section throughout its length extending inwardly from one of the lateral faces thereof, a carbide cutting tip fitting lengthwise within said recess, said recess having side walls cut away adjacent the face of said head to permit said tip to be brought to cutting position in said recess without bringing the cutting edge of said tip substantially above the plane of the remaining side walls of said recess, whereby said tip is reenforced laterally in the plane of the cutting edge thereof when it is in cutting position, and means for adjustably positioning said tip in said recess.

8. In a carbide cutting tool, a tool holder having a shank portion adapted to be secured to the tool post of a machine tool and a head portion, said head portion having a recess of rectangular cross-section substantially throughout its length extending inwardly from one of the lateral faces thereof and adapted to receive a carbide tip of rectangular cross-section in endwise relation therein, means for releasably holding said tip in predetermined adjusted position in said recess including a shim positioned at one side of said tip, and means for urging said shim into clamping relation with said tip.

9. In a cutting tool, a tool holder having a shank adapted to be secured to the tool post of a machine tool and a head portion having a recess of substantially uniform cross-section throughout its length extending inwardly from one of the lateral faces thereof and being inclined to the vertical sufficiently to insure cutting clearance for a cutting tip of substantially the same uniform cross-section inserted therein, and said recess having side walls cut away adjacent the face of said head to permit said cutting tip to be brought to cutting position in said recess without bringing the cutting edge thereof substantially above the plane of the remaining side walls of the recess, whereby said tip is reenforced laterally adjacent the plane of the cutting edge when it is in cutting position, and means for releasably holding said tip in a predetermined adjusted position lengthwise of said recess.

10. In a cutting tool, a tool holder having a shank adapted to be secured to the tool post of a machine tool and a head portion having a recess of substantially uniform polygonal cross-section throughout its length extending inwardly from one of the lateral faces thereof and adapted to receive a cutting tip of substantially the same uniform cross-section fitted lengthwise therein, said recess having side walls cut away adjacent the face of said head to permit said cutting tip to be brought to cutting position in said recess without bringing the cutting edge of said tip substantially above the plane of the remaining side walls of said recess, whereby said tip is reenforced laterally in the plane of the cutting edge thereof when it is in cutting position, and means for releasably holding said tip in a predetermined adjusted position lengthwise of said recess.

THOMAS HOLLIS, JR.